United States Patent
Misumi et al.

(10) Patent No.: US 9,661,167 B2
(45) Date of Patent: May 23, 2017

(54) COMMUNICATION APPARATUS CONFIGURED TO PERFORM NON-CONTACT COMMUNICATION WITH EXTERNAL DEVICE

(71) Applicant: BROTHER KOGYO KABUSHIKI KAISHA, Nagoya-shi, Aichi-ken (JP)

(72) Inventors: Kazuhito Misumi, Aichi (JP); Wataru Fujishiro, Aichi (JP); Kentaro Aoyama, Aichi (JP); Etsuteru Inoue, Aichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/580,414

(22) Filed: Dec. 23, 2014

(65) Prior Publication Data

US 2015/0189112 A1   Jul. 2, 2015

(30) Foreign Application Priority Data

Dec. 27, 2013   (JP) .................................. 2013-271979

(51) Int. Cl.
*G06K 15/00*   (2006.01)
*H04N 1/00*   (2006.01)
(Continued)

(52) U.S. Cl.
CPC ......... *H04N 1/00888* (2013.01); *G06F 1/266* (2013.01); *G06F 1/3206* (2013.01);
(Continued)

(58) Field of Classification Search
None
See application file for complete search history.

(56) References Cited

U.S. PATENT DOCUMENTS 7,112,896 B2 * 9/2006 Kinnard .................... H02J 1/10
  307/43
8,458,483 B1   6/2013 Bailey et al.
(Continued)

FOREIGN PATENT DOCUMENTS

| JP | 2012-014422 A | 1/2012 |
| JP | 4892652 B1 | 3/2012 |
| WO | 2013/111537 A1 | 8/2013 |

OTHER PUBLICATIONS

Extended European Search Report dated May 4, 2015 from related EP 14200339.1.

*Primary Examiner* — Miya J Williams
(74) *Attorney, Agent, or Firm* — Scully, Scott, Murphy & Presser, PC

(57) ABSTRACT

A communication controller controls non-contact communication with an external device via an antenna while at least one of first and second power is supplied. A first circuit electrically connects a first power supply to a communication node. A second circuit electrically connects a second power supply to the communication node. The first circuit includes a first electrical component configured to prevent second power from being supplied to a particular target electrically connected to the first power supply while the second power is supplied to the communication node. The communication controller communicates with the communication node in a certain data communication method while the second power is supplied to the communication node. In response to reception of electric power from the external device via the antenna, the second power supply supplies the second power to the communication controller, and supplies the second power to the communication node through the second circuit.

13 Claims, 5 Drawing Sheets

(51) Int. Cl.
*H04B 5/00* (2006.01)
*G06F 1/32* (2006.01)
*H02J 50/20* (2016.01)
*G06F 1/26* (2006.01)
*H02J 1/10* (2006.01)
*H04W 52/02* (2009.01)
*H04W 4/00* (2009.01)

(52) U.S. Cl.
CPC .......... *G06F 1/3215* (2013.01); *G06F 1/3278* (2013.01); *G06F 1/3287* (2013.01); *H02J 1/108* (2013.01); *H02J 50/20* (2016.02); *H04B 5/0031* (2013.01); *H04B 5/0037* (2013.01); *H04N 1/00904* (2013.01); *H02J 1/10* (2013.01); *H04N 2201/006* (2013.01); *H04N 2201/0094* (2013.01); *H04W 4/008* (2013.01); *H04W 52/0296* (2013.01)

(56) References Cited

U.S. PATENT DOCUMENTS

| | | |
|---|---|---|
| 2005/0114718 A1* | 5/2005 | Ito .................. 713/300 |
| 2011/0270025 A1* | 11/2011 | Fridez et al. .................. 600/37 |
| 2012/0005497 A1 | 1/2012 | Tsukamoto et al. |
| 2012/0164944 A1 | 6/2012 | Yamaoka et al. |
| 2012/0303981 A1* | 11/2012 | Heath .................. H02J 1/108 713/300 |
| 2012/0311555 A1 | 12/2012 | Nijenkamp |
| 2013/0229684 A1* | 9/2013 | Yasuzaki ..................... 358/1.15 |
| 2014/0108846 A1* | 4/2014 | Berke .............. G06F 13/4221 713/340 |
| 2014/0329462 A1* | 11/2014 | Khorram ............... H04W 4/008 455/41.1 |
| 2014/0342665 A1 | 11/2014 | Amano |
| 2015/0188609 A1* | 7/2015 | Inoue .................. H04B 5/0037 455/41.1 |

\* cited by examiner

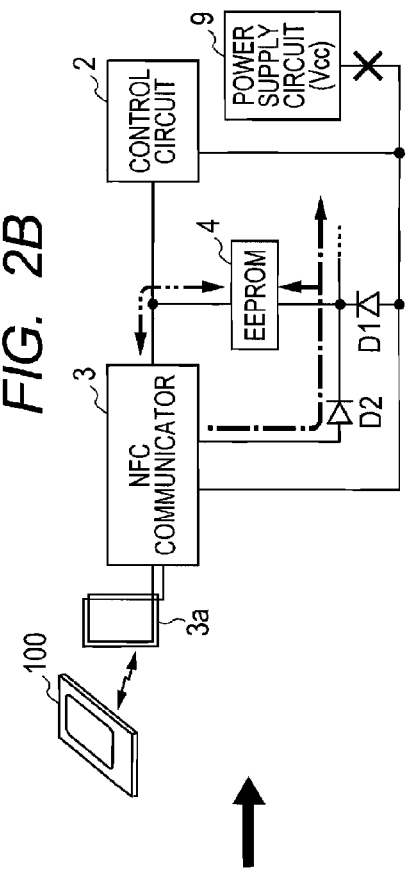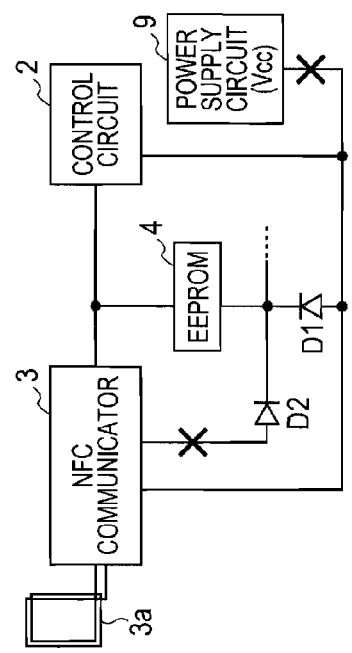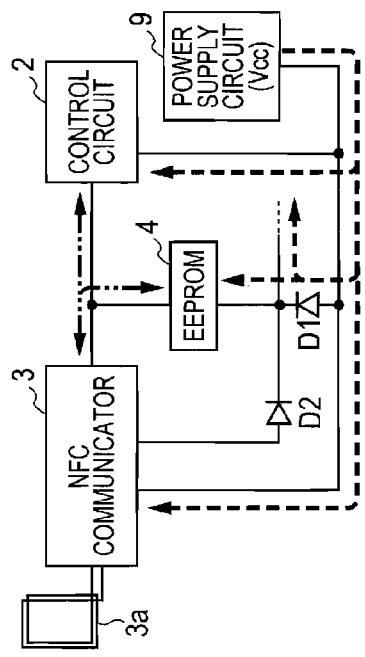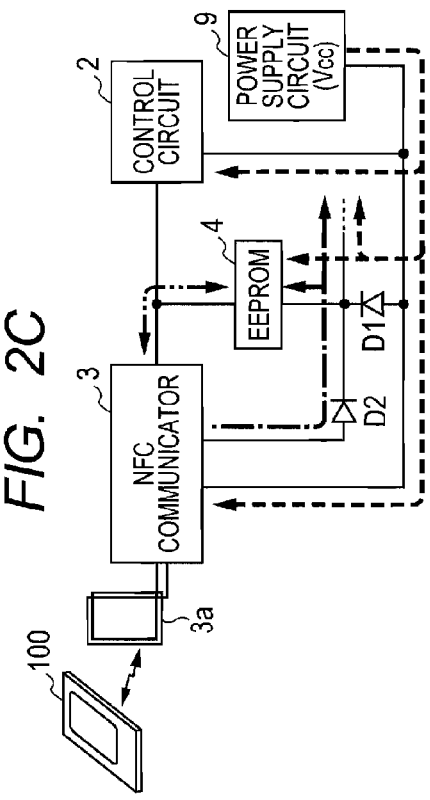

COMMUNICATION APPARATUS CONFIGURED TO PERFORM NON-CONTACT COMMUNICATION WITH EXTERNAL DEVICE

CROSS REFERENCE TO RELATED APPLICATIONS

This application claims priority from Japanese Patent Application No. 2013-271979 filed Dec. 27, 2013. The entire content of the priority application is incorporated herein by reference.

TECHNICAL FIELD

The invention relates to a communication apparatus that is configured to perform non-contact communication with an external device.

BACKGROUND

There are various communication apparatuses that are configured to perform non-contact communication with external devices. By using non-contact communication, for example, it is possible to access a memory in a communication apparatus from an external device for reading or writing data, and to instruct a communication apparatus to perform a function from an external device. For example, NFC (Near Field Communication) is known as a non-contact communication method.

In these communication apparatuses, it is convenient if non-contact communication with an external device can be performed as necessary, even in a state where power is turned off or a power plug is pulled out and hence a normal operation is stopped.

Technology is known that power is fed from an external device to a terminal device on which a battery is not mounted, by non-contact power feeding, so that the terminal device is started up as usual by the fed electric power for performing necessary processes.

SUMMARY

According to one aspect, the invention provides a communication apparatus. The communication apparatus includes a first power supply, an antenna, a second power supply, a communication controller, a main controller, a communication node, a first circuit, and a second circuit. The first power supply is configured to generate first power. The antenna is configured to perform non-contact communication with an external device. The second power supply is configured to generate second power based on electric power supplied from the external device via the antenna, the second power being less than the first power. The communication controller is configured to control non-contact communication with the external device via the antenna while at least one of the first power and the second power is supplied to the communication controller. The main controller is configured to control the communication apparatus to perform a function thereof while the first power is supplied to the main controller. The communication node is configured to operate while at least one of the first power and the second power is supplied to the communication node. The first circuit electrically connects the first power supply to the communication node. The second circuit electrically connects the second power supply to the communication node. The first circuit includes a first electrical component configured to prevent the second power from being supplied to a particular target electrically connected to the first power supply while the second power is supplied to the communication node, the particular target being different from the communication node. The communication controller is configured to communicate with the communication node in a certain data communication method while the second power is supplied to the communication node. The second power supply is configured, in response to reception of electric power from the external device via the antenna, to supply the second power to the communication controller, and to supply the second power to the communication node through the second circuit.

BRIEF DESCRIPTION OF THE DRAWINGS

Embodiments in accordance with the invention will be described in detail with reference to the following figures wherein:

FIGS. 2A through 2D are explanatory diagrams showing operational examples of the multifunction peripheral;

DETAILED DESCRIPTION

Some aspects of the invention will be described while referring to the accompanying drawings.

(1) Configuration of Multifunction Peripheral 1

Figure 1:
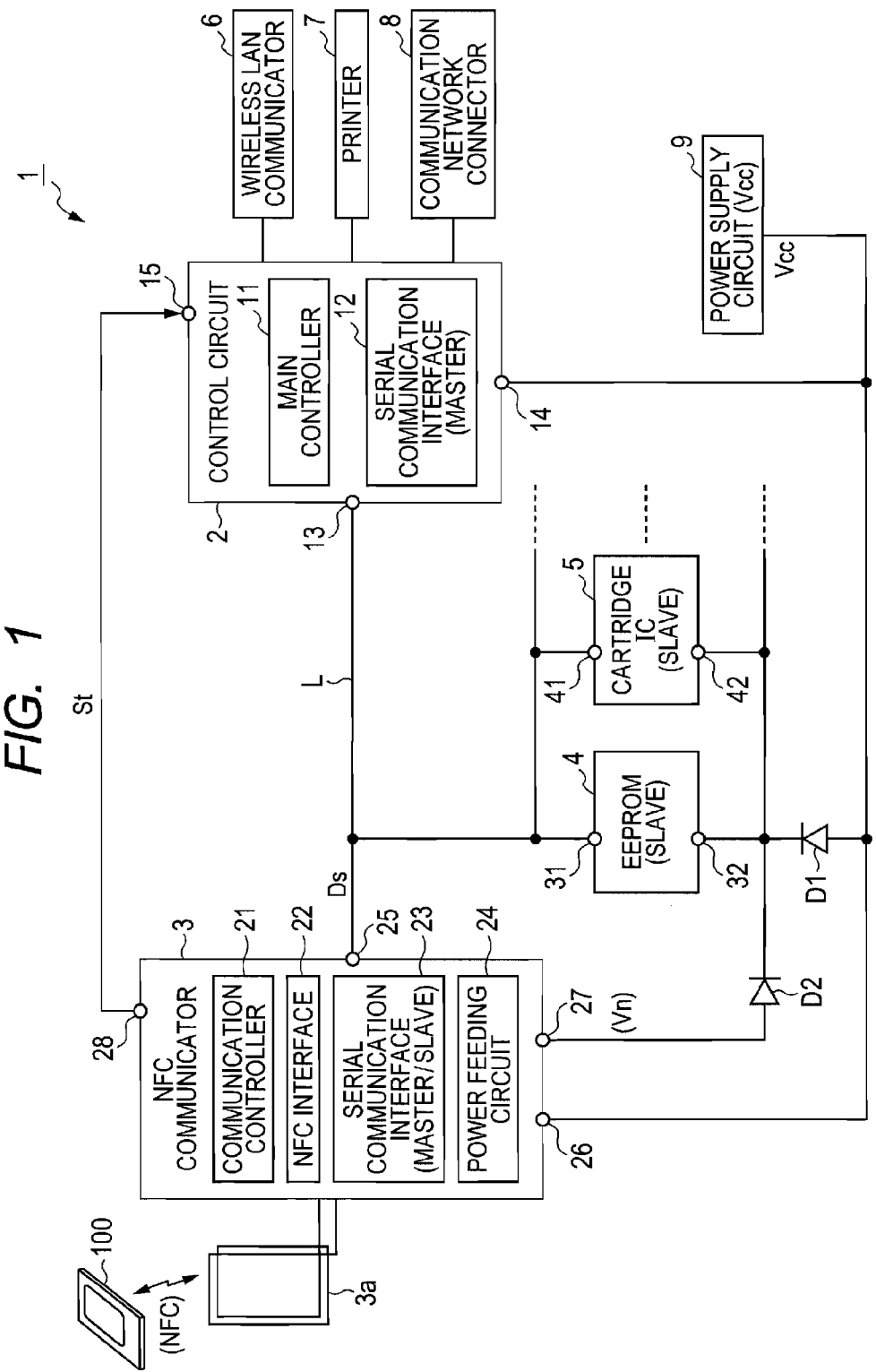
FIG. 1 is an explanatory diagram showing the overall configuration of a multifunction peripheral according to an embodiment.

A multifunction peripheral 1 of the present embodiment shown in FIG. 1 is a multifunction peripheral having a plurality of functions including a printer function, a telephone function, and so on. The multifunction peripheral 1 has a wireless communication function of two kinds of wireless communication methods, that is, wireless LAN (Local Area Network) and NFC. The wireless LAN is a communication method that is specified by the IEEE802.11a/b/g/n standard, for example. Radio waves of 2.4 GHz or 5 GHz frequency band are used. The NFC is a near field wireless communication (non-contact communication) in which communication distance is limited to approximately 10 cm (centimeters). For example, radio waves of 13.56 MHz frequency band are used. The multifunction peripheral 1 is capable of performing NFC communication with an external communication device having a wireless communication function using NFC (hereinafter referred to as "NFC communication"). In the present embodiment, a smartphone 100 shown in FIG. 1 is described as an example of a communication device that is capable of performing NFC communication.

More specifically, as shown in FIG. 1, the multifunction peripheral 1 includes a control circuit 2, an NFC communicator 3, an EEPROM 4, a cartridge IC 5, a wireless LAN communicator 6, a printer 7, a communication network connector 8, and a power supply circuit 9.

The power supply circuit 9 rectifies and transforms electric power inputted from the outside (for example, commercial electric power of AC 100V), and generates a first power supply voltage Vcc which is main power supply for operating the multifunction peripheral 1. The first power supply voltage Vcc generated by the power supply circuit 9 is supplied to each part in the multifunction peripheral 1, such as the control circuit 2, the NFC communicator 3, the EEPROM 4, and the cartridge IC 5.

The control circuit 2 controls various functions of the multifunction peripheral 1. The control circuit 2 includes a main controller 11 and a serial communication interface (I/F) 12. Further, the control circuit 2 has a serial port 13, a main power input port 14, and an interrupt port 15, as ports to which electric power and signals are inputted or from which electric power and signals are outputted.

The serial port 13 is connected to a serial line L which is a communication bus for serial communication. The first power supply voltage Vcc is inputted to the main power input port 14 from the power supply circuit 9. When the first power supply voltage Vcc is inputted to the control circuit 2 from the power supply circuit 9, the control circuit 2 operates by using the first power supply voltage Vcc as power supply (power source).

Interrupts are inputted to the interrupt port 15 from the NFC communicator 3. An interrupt inputted to the interrupt port 15 from the NFC communicator 3 is actually a state notification signal St of H (High) level or L (Low) level. A phrase that an interrupt is inputted means that the state notification signal St becomes H level.

In the control circuit 2, the serial communication interface 12 is a communication interface for performing data communication by serial communication with the NFC communicator 3 and communication nodes of other communication targets. The serial communication interface 12 is connected to the serial port 13. Data of serial communication are transmitted and received through the serial communication interface 12 and the serial port 13.

The control circuit 2 is mutually connected to a plurality of data communication targets including the NFC communicator 3, the EEPROM 4, and the cartridge IC 5, by the serial line L. Hence, the control circuit 2 performs serial communication mutually with the plurality of data communication targets including the NFC communicator 3, the EEPROM 4, and the cartridge IC 5, through the serial line L.

Serial communication in the present embodiment is serial communication of a master-slave method. The control circuit 2 serves as the master in serial communication of the master-slave method. On the other hand, each of other communication nodes serves as the slave. Here, although the NFC communicator 3 normally serves as the slave, the NFC communicator 3 serves as the master in a certain case. That is the NFC communicator 3 can serve as both the master and the slave in serial communication. Note that master-slave communication methods include various standards such as I2C (Inter-Integrated Circuit), USB (Universal Serial Bus), SDIO (Secure Digital Input/Output Card), and SPI (Serial Peripheral Interface), for example.

In the control circuit 2, the main controller 11 at least includes a microcomputer having a CPU, a memory, and so on. The main controller 11 performs controls of serial communication through the serial communication interface 12, controls of the wireless LAN communicator 6, controls of the printer 7, controls of the communication network connector 8, and so on. Further, the main controller 11 performs various controls based on an interrupt inputted from the NFC communicator 3 (the state notification signal St).

The wireless LAN communicator 6 performs communication with an external communication device by wireless LAN. The printer 7 prints images on various recording mediums. The communication network connector 8 is connected to an external communication network, and performs communication such as telephone and facsimile.

The NFC communicator 3 is a wireless communication module for performing NFC communication with the smartphone 100. The NFC communicator 3 is mounted at an upper side within the multifunction peripheral 1. A loop antenna 3a for NFC communication is connected to the NFC communicator 3. By holding the smartphone 100 in a particular region near the upper side of the loop antenna 3a, NFC communication between the multifunction peripheral 1 and the smartphone 100 becomes possible, and wireless communication is performed in a particular communication procedure.

In the present specification, when it is described that the smartphone 100 is "held near" or "held over" the multifunction peripheral 1, unless otherwise noted, it means that a communication device and the multifunction peripheral 1 are put in such positional relationship that NFC communication can be performed mutually between the communication device and the multifunction peripheral 1.

The NFC communicator 3 includes a communication controller 21, an NFC interface 22, a serial communication interface 23, and a power feeding circuit 24. Further, the NFC communicator 3 has a serial port 25, a main power input port 26, a power feeding port 27, and a state notification port 28, as ports to which electric power and signals are inputted or from which electric power and signals are outputted.

The serial line L is connected to the serial port 25. A power supply route from the power supply circuit 9 is connected to the main power input port 26, so that the first power supply voltage Vcc is inputted from the power supply circuit 9. When the first power supply voltage Vcc is inputted to the NFC communicator 3 from the power supply circuit 9, the NFC communicator 3 operates by using the first power supply voltage Vcc as power supply (power source). A second power supply voltage Vn (described later in detail) generated by the power feeding circuit 24 is outputted from the power feeding port 27. An interrupt (the state notification signal St) is outputted from the state notification port 28 to the control circuit 2.

When the smartphone 100 is held near the loop antenna 3a, there is a possibility that serial communication is performed. Hence, the communication controller 21 outputs an interrupt to the control circuit 2 (the state notification signal St is set to H level).

In the NFC communicator 3, the serial communication interface 23 is a communication interface for performing data communication with the control circuit 2 and other data communication targets by serial communication. The serial communication interface 23 is connected to the serial port 25. Data of serial communication are transmitted and received through the serial communication interface 23 and the serial port 25. The NFC interface 22 is a wireless communication interface for performing NFC communication with the smartphone 100. The loop antenna 3a is connected to the NFC interface 22.

When the smartphone 100 is held near the multifunction peripheral 1, electromotive force is induced in the loop antenna 3a (that is, electric power is received from the communication device). The power feeding circuit 24 generates a DC (direct current) second power supply voltage Vn based on the induced electromotive force. In the present embodiment, the value of the second power supply voltage Vn is the same as the value of the first power supply voltage Vcc generated by the power supply circuit 9. However, the value of the second power supply voltage Vn can be set appropriately, as long as the communication nodes of serial communication such as the EEPROM 4 and the cartridge IC 5 (the supply target of the second power supply voltage Vn) are operable.

When electric power is received from the smartphone 100 by the loop antenna 3a, the power feeding circuit 24 generates the second power supply voltage Vn and supplies the generated second power supply voltage Vn to each part in the NFC communicator 3 such as the communication controller 21 and the interfaces 22, 23. Hence, even if the NFC communicator 3 is not supplied with the first power supply voltage Vcc by the power supply circuit 9, the communication controller 21 starts operation when the smartphone 100 is held near the loop antenna 3a and the second power supply voltage Vn is generated.

The second power supply voltage Vn generated by the power feeding circuit 24 is outputted from the power feeding port 27 to the outside (the outside of the NFC communicator 3 within the multifunction peripheral 1). In the present embodiment, the communication controller 21 controls the power feeding circuit 24 to output the second power supply voltage Vn to the outside. The power feeding port 27 is connected, via a second diode D2, to each power input port 32, 42 of the communication nodes such as the EEPROM 4 and the cartridge IC 5. When the second power supply voltage Vn is outputted from the power feeding port 27, the second power supply voltage Vn is supplied to the communication nodes such as the EEPROM 4 and the cartridge IC 5.

The communication controller 21 at least includes a microcomputer having a CPU, a memory, and so on. The communication controller 21 controls serial communication through the serial communication interface 23, controls NFC communication through the NFC interface 22, and controls the power feeding circuit 24 (for example, controls outputting the second power supply voltage Vn to the outside). In controls of serial communication, the communication controller 21 normally operates as the slave. In a certain state, however, the communication controller 21 sets itself as the master, and operates as the master. The communication controller 21 also controls the state notification signal St based on whether the smartphone 100 is held near the multifunction peripheral 1.

The EEPROM 4 is a nonvolatile memory in which stored contents (data) are rewritable electrically. In the present embodiment, the EEPROM 4 stores various kinds of information, such as control information that is needed for the main controller 11 of the control circuit 2 to control execution of various functions, and function execution information that is generated as a result of the main controller 11 controlling execution of various functions.

The control information includes, for example, product setting information, connection information with an access point (not shown) which is a relay device in wireless LAN communication, ruled-line adjustment and color correction information, and so on. The function execution information includes, for example, telephone directory information, error information at the time of a failure, usage history of genuine cartridges, and so on.

The EEPROM 4 can operate as a communication node of serial communication. That is, the EEPROM 4 includes a serial port 31. The serial line L is connected to the serial port 31. Hence, the EEPROM 4 can perform serial communication with the control circuit 2, the NFC communicator 3, and so on, via the serial port 31. The EEPROM 4 operates as the slave in serial communication. Various kinds of information are written in or read out from the EEPROM 4 by serial communication (that is, through the serial line L).

The EEPROM 4 has a power input port 32. The power input port 32 is connected to the power supply circuit 9 via a first diode D1, and is connected to the power feeding port 27 of the NFC communicator 3 via the second diode D2. That is, the power input port 32 of the EEPROM 4 can be supplied with the first power supply voltage Vcc from the power supply circuit 9 via the first diode D1, and can also be supplied with the second power supply voltage Vn from the NFC communicator 3 via the second diode D2. Hence, the EEPROM 4 starts operation upon receiving supply of at least one of the first power supply voltage Vcc and the second power supply voltage Vn, so that the above-described serial communication can be performed.

The cartridge IC 5 is mounted in an ink (or toner) cartridge that is used by the printer 7 at the time of printing. Here, if the printer 7 does not have a color printing function but has only a monochromatic printing function, there is normally one ink cartridge and hence one cartridge IC. In contrast, if the printer 7 has a color printing function, there is normally a plurality of ink cartridges and hence there is a plurality of cartridge ICs corresponding to the plurality of ink cartridges. The printer 7 of the present embodiment has only a monochromatic printing function.

The cartridge IC 5 has a memory capable of storing information, and stores, in the memory, various kinds of information relating to the ink cartridge in which the memory is mounted. The information stored in the memory of the cartridge IC 5 includes, for example, model information of the ink cartridge, information on a remaining amount of ink, and so on.

The cartridge IC 5 can operate as a communication node of serial communication. That is, the cartridge IC 5 has a serial port 41. The serial line L is connected to the serial port 41. Hence, the cartridge IC 5 can perform serial communication with the control circuit 2, the NFC communicator 3, and so on, via the serial port 41. The cartridge IC 5 operates as the slave in serial communication. Various kinds of information are written in or read out from the cartridge IC 5 by serial communication (that is, through the serial line L).

The cartridge IC 5 has a power input port 42. The power input port 42 is connected to the power supply circuit 9 via the first diode D1, and is connected to the power feeding port 27 of the NFC communicator 3 via the second diode D2. That is, the power input port 42 of the cartridge IC 5 can be supplied with the first power supply voltage Vcc from the power supply circuit 9 via the first diode D1, and can also be supplied with the second power supply voltage Vn from the NFC communicator 3 via the second diode D2. Hence, the cartridge IC 5 starts operation upon receiving supply of at least one of the first power supply voltage Vcc and the second power supply voltage Vn, so that the above-described serial communication can be performed.

The first diode D1 is provided for cutting off the second power supply voltage Vn outputted from the power feeding port 27 of the NFC communicator 3 from being supplied, through the supply route of the first power supply voltage Vcc, to other supply targets of the first power supply voltage Vcc that are other than the communication nodes such as the EEPROM 4 and the cartridge IC 5, which are original supply targets. Here, "cutting off the second power supply voltage Vn" is an example of "preventing second power from being supplied" in the claims.

The second diode D2 is provided for cutting off the first power supply voltage Vcc outputted from the power supply circuit 9 from being inputted (counterflowing) to the power feeding port 27 of the NFC communicator 3 via the supply route of the second power supply voltage Vn. Here, "cutting off the first power supply voltage Vcc" is an example of "preventing first power from being supplied" in the claims.

Note that each of the control circuit 2, the NFC communicator 3, the EEPROM 4, and the cartridge IC 5 is made of a packaged semiconductor integrated circuit.

(2) Schematic Configuration of Smartphone 100

The smartphone 100 is a multifunction mobile communication device having functions of common mobile phones, such as telephone and mail functions, as well as Internet connection function. In addition, various functions can be added to the smartphone 100 by installing various kinds of application software (hereinafter abbreviated as "application").

The smartphone 100 is capable of wireless LAN communication and NFC communication. Hence, the smartphone 100 perform mutual communication with the multifunction peripheral 1 by NFC communication. Further, the smartphone 100 is capable of wireless LAN communication with other communication devices.

The applications of the smartphone 100 include an application for receiving various information stored in the EEPROM 4, the cartridge IC 5, and so on, in the multifunction peripheral 1 through NFC communication (hereinafter also referred to as "information receiving application"), an application for writing information to the EEPROM 4, the cartridge IC 5, and so on, in the multifunction peripheral 1 through NFC communication (hereinafter also referred to as "information writing application"), and so on. By using these applications, for example, it is possible to read desired information from the multifunction peripheral 1 and write the read information in another multifunction peripheral, and conversely, it is possible to read information from another multifunction peripheral and write the read information in the multifunction peripheral 1. Also, in the present embodiment, even in a state where the main power of the multifunction peripheral 1 is off (that is, the first power supply voltage Vcc is not supplied), by holding the smartphone 100 near the multifunction peripheral 1, non-contact power feeding from the smartphone 100 causes the second power supply voltage Vn to be generated in the NFC communicator 3 of the multifunction peripheral 1. Hence, the above-mentioned applications can be used in a state where the main power of the multifunction peripheral 1 remains off.

(3) Operational Example of Multifunction Peripheral 1

An operational example of the multifunction peripheral 1 will be described while referring to FIGS. 2A-2D. In FIGS. 2A-2D, for simplification, elements needed for description of the operational example, out of the elements of the multifunction peripheral 1, are illustrated in a simplified manner.

When the power plug of the multifunction peripheral 1 is pulled out and the smartphone 100 is not held near the multifunction peripheral 1 (see FIG. 2A), neither the first power supply voltage Vcc nor the second power supply voltage Vn is generated, and both the control circuit 2 and the NFC communicator 3 are in a stopped state. FIG. 2A shows that state in a schematic manner. When the power plug is inserted but the main power is turned off by a switch, too, the first power supply voltage Vcc is not generated.

The multifunction peripheral 1 of the present embodiment has an OFF mode as an operational mode. Specifically, after a startup, when a particular OFF mode condition is satisfied, supplying of the first power supply voltage Vcc from the power supply circuit 9 is completely stopped, which shifts the operational mode to the OFF mode. In the OFF mode, however, operations of requisite minimum functions such as ON-OFF detection of the power switch and OFF-mode cancel condition detection are continued by a backup power supply (not shown) such as a secondary battery and a supercapacitor. Hence, if the power switch is turned on in the OFF mode or if an OFF-mode cancel condition is satisfied (for example, an incoming telephone call or facsimile is received, and so on), the OFF mode is canceled, the power supply circuit 9 starts up, and the operational mode shifts to a normal operation.

If, for example, the smartphone 100 is held near the multifunction peripheral 1 in a state where the operation of the multifunction peripheral 1 is stopped without supply of the power supply voltages Vcc, Vn, as shown in FIG. 2B, the second power supply voltage Vn is generated in the NFC communicator 3, which causes the NFC communicator 3 to start up. Upon startup of the NFC communicator 3, the second power supply voltage Vn is supplied from the NFC communicator 3 to the communication nodes such as the EEPROM 4 and the cartridge IC 5, which enables serial communication between the NFC communicator 3 and the communication nodes, and hence enables communication between the smartphone 100 and the communication nodes via the NFC communicator 3. In serial communication in this case, the NFC communicator 3 operates as the master. Here, upon detecting that the smartphone 100 is held near the multifunction peripheral 1 at startup, the NFC communicator 3 outputs an interrupt to the control circuit 2 (the state notification signal St is set to H level).

When the power switch is turned on or the OFF-mode cancel condition is satisfied and hence the power supply circuit 9 starts up in a state shown in FIG. 2B. as shown in FIG. 2C, the first power supply voltage Vcc is outputted from the power supply circuit 9. This causes the control circuit 2 to start up.

After that, if the smartphone 100 is separated from the multifunction peripheral 1 and NFC communication or serial communication using the NFC communicator 3 as the master is stopped, the second power supply voltage Vn is not generated anymore. However, the power supply circuit 9 is started up. Hence, as shown in FIG. 2D, the NFC communicator 3 and the EEPROM 4 can continue operating by using the first power supply voltage Vcc supplied from the power supply circuit 9.

After the smartphone 100 is separated from the multifunction peripheral 1, the NFC communicator 3 starts operating as the slave in serial communication. This enables the control circuit 2, the NFC communicator 3, and the EEPROM 4 to perform serial communication using the control circuit 2 as the master.

(4) Various Control Processes Executed by Multifunction Peripheral 1

Figure 3:
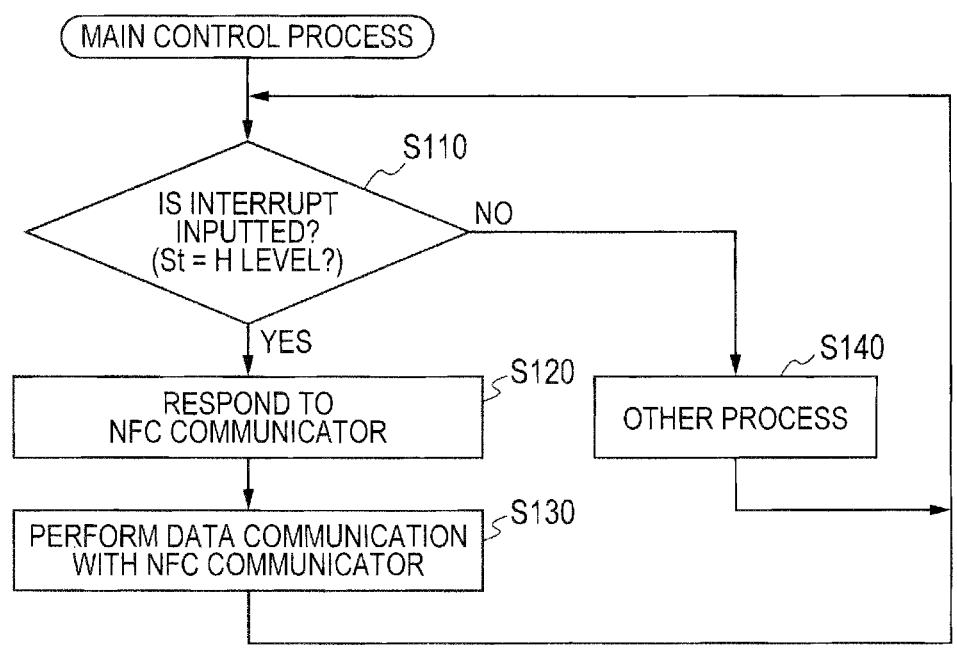
FIG. 3 is a flowchart showing a main control process.
Figure 4:
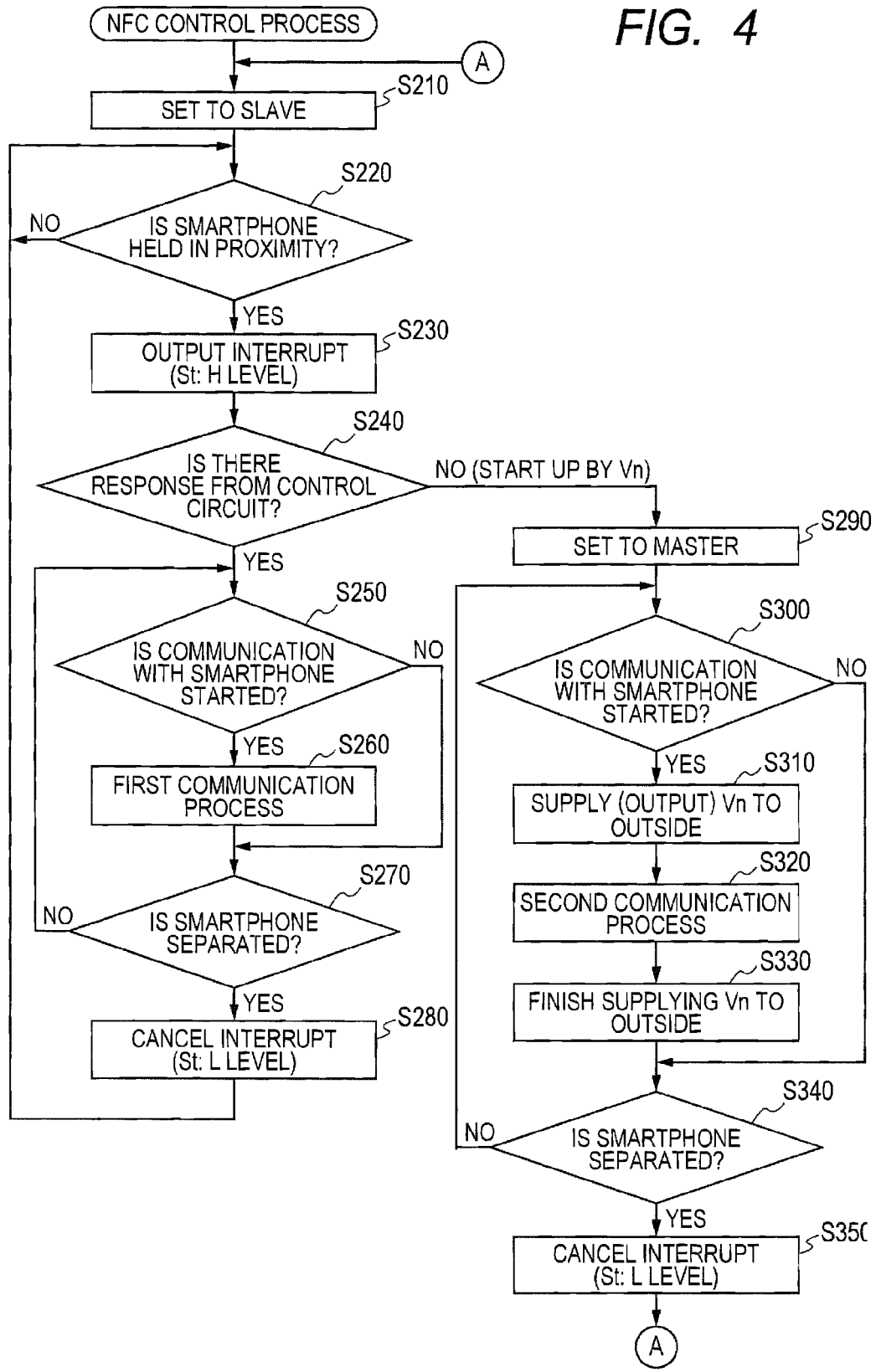
FIG. 4 is a flowchart showing an NFC control process.

Descriptions will be provided for a main control process executed by the main controller 11 of the control circuit 2 in the multifunction peripheral 1 and for an NFC control process executed by the communication controller 21 of the NFC communicator 3 while referring to FIGS. 3 and 4.

(4-1) Main Control Process

A main control process executed by the main controller 11 of the control circuit 2 will be described while referring to FIG. 3. In the main controller 11, upon starting up by the first power supply voltage Vcc, the CPU reads out a program of the main control process in FIG. 3 from the memory and executes the program.

Upon starting the main control process in FIG. 3, in S110 the CPU of the main controller 11 determines whether an interrupt is inputted from the NFC communicator 3. If no interrupt is inputted (S110: NO), in 5140 the CPU executes other processes (processes relating other various functions; details are omitted) and returns to S110.

If an interrupt is inputted in S110 (S110: YES), in S120 the CPU transmits, to the NFC communicator 3, a response to the interrupt by serial communication. In S130, the CPU performs data communication (serial communication) with the NFC communicator 3 and returns to S110.

(4-2) NFC Control Process

An NFC control process executed by the communication controller 21 of the NFC communicator 3 will be described while referring to FIG. 4. When the communication controller 21 starts up by the first power supply voltage Vcc or the second power supply voltage Vn, the CPU reads a program of the NFC control process in FIG. 4 from the memory and executes the program.

Upon starting the NFC control process in FIG. 4, in S210 the CPU of the communication controller 21 sets the operational mode of serial communication to the slave. In S220, the CPU determines whether the smartphone is held in proximity (that is, whether the smartphone is held near the multifunction peripheral 1). If the smartphone is held in proximity (S220: YES), in S230 the CPU outputs an interrupt to the control circuit 2. That is, the state notification signal St is set to H level.

In S240, the CPU determines whether there is a response to issuance of the interrupt from the control circuit 2. If there is a response from the control circuit 2 (S240: YES), in S250 the CPU determines whether NFC communication with the smartphone is started. If NFC communication with the smartphone is not started (S250: NO), the process advances to S270. If NFC communication with the smartphone is started (S250: YES), in S260 the CPU executes a first communication process. The first communication process includes an NFC communication process with the smartphone and a serial communication process with the control circuit 2 that occurs in connection with the NFC communication. In S270, the CPU determines whether the smartphone is separated from the multifunction peripheral 1. This determination is performed based on, for example, whether the second power supply voltage Vn can be generated, whether the current state is a state in which NFC communication can be performed, or the like. If the smartphone is not separated from the multifunction peripheral 1 (that is, the smartphone is still held near the multifunction peripheral 1) (S270: NO), the process returns to S250. If the smartphone is separated from the multifunction peripheral 1 (S270: YES), in S280 the CPU cancels the interrupt to the control circuit 2. That is, the state notification signal St is set to L level. After the process in S280, the process returns to S220.

If there is no response to output of the interrupt from the control circuit 2 in S240 (S240: NO), in S290 the CPU sets the operational mode of serial communication to the master. In S300, the CPU determines whether NFC communication with the smartphone is started. If NFC communication with the smartphone is not started (S300: NO), the process advances to S340. If NFC communication with the smartphone is started (S300: YES), in S310 the CPU controls the power feeding circuit 24 to output the second power supply voltage Vn generated by the power feeding circuit 24 from the power feeding port 27. That is, the second power supply voltage Vn is supplied to the outside of the NFC communicator 3. If NFC communication with the smartphone is started, there is a possibility that serial communication with the communication nodes such as the EEPROM 4 and the cartridge IC 5 becomes necessary. Hence, the CPU starts supplying of the second power supply voltage Vn to the outside.

In S320, a second communication process is executed. The second communication process includes an NFC communication process with the smartphone and a serial communication process with the communication nodes such as the EEPROM 4 and the cartridge IC 5 that occurs in connection with the NFC communication. Here, the NFC communicator 3 performs at least one of reading of data stored in the memory of the communication node (the EEPROM 4 or the cartridge IC 5) and writing of data to the memory of the communication node by performing data communication with the communication node based on the content of the non-contact communication with the smartphone 100. In S330, the CPU finishes supplying of the second power supply voltage Vn to the outside.

In S340, similar to S270, the CPU determines whether the smartphone is separated from the multifunction peripheral 1. If the smartphone is not separated from the multifunction peripheral 1 (S340: NO), the process returns to S300. If the smartphone is separated from the multifunction peripheral 1 (S340: YES), the process advances to S350. In S350, the CPU cancels the interrupt to the control circuit 2. After the process in S350, the process returns to S210.

(5) Effects of Embodiment

According to the multifunction peripheral 1 of the above-described embodiment. NFC communication can be performed with the smartphone 100 even in a state where the main power is turned off, the operational mode is OFF mode, or the like, that is, the power supply circuit 9 stops operation and the first power supply voltage Vcc is not generated (hereinafter also referred to as "main power OFF state"). Further, even in the main power OFF state, when an external communication device capable of NFC communication is held near the multifunction peripheral 1 and electric power is received, the second power supply voltage Vn is supplied to communication nodes. Hence, even in the main power OFF state, the NFC communicator 3 can perform NFC communication with an external communication device and serial communication with other communication nodes.

With this configuration, for example, even if the power plug is pulled out from the multifunction peripheral 1, the multifunction peripheral 1 is in the OFF mode, or the multifunction peripheral 1 has a failure and the control circuit 2 cannot operate, by holding the smartphone 100 near the multifunction peripheral 1, reading and writing of information can be performed with the communication nodes such as the EEPROM 4 and the cartridge IC 5.

Thus, according to the multifunction peripheral 1 in the present embodiment, even when the power supply circuit 9 stops operation, an access can be made from an external communication device to the multifunction peripheral 1 by NFC communication (especially an access to the communication nodes such as the EEPROM 4 and the cartridge IC 5), while suppressing the amount of power fed from the smartphone 100.

For example, assume that, during use of a multifunction peripheral, the multifunction peripheral has suddenly failed. In this case, as one of actions taken by the user, it is conceived that the user purchases a new multifunction peripheral. Naturally, the new multifunction peripheral operates normally. However, the user has to again input telephone directory data that is registered in the formally-used (failed) multifunction peripheral, perform settings of wireless LAN, and so on, from the beginning, in the new multifunction peripheral. Such work is very bothersome.

In contrast, according to the multifunction peripheral 1 in the present embodiment, the user holds the smartphone 100 near the multifunction peripheral 1 that has failed and cannot be powered on, and uses a particular application to read various kinds of registration information, setting information, and so on, from the failed multifunction peripheral 1. After the reading, by holding the smartphone 100 near the new multifunction peripheral 1 to execute a particular application, the read information can be transferred to and written to the new multifunction peripheral 1.

That is, without turning power to the failed multifunction peripheral 1 or the new multifunction peripheral 1, information can be transferred easily from one to the other by using the smartphone 100. Thus, it is possible to set a registration and setting state of the new multifunction peripheral 1 to the same state of the formerly-used multifunction peripheral 1.

In the multifunction peripheral 1, the second diode D2 is connected to the power feeding port 27 of the NFC communicator 3, so that the second power supply voltage Vn from the power feeding port 27 is supplied to the supply target via the second diode D2. Further, the first diode D1 is connected to the supply route of the first power supply voltage Vcc from the power supply circuit 9 to the communication nodes such as the EEPROM 4 and the cartridge IC 5, so that the first power supply voltage Vcc is supplied, via the first diode D1, from the power supply circuit 9 to the communication nodes such as the EEPROM 4 and the cartridge IC 5.

The above-mentioned configuration suppresses the second power supply voltage Vn outputted from the power feeding port 27 of the NFC communicator 3 from counterflowing to the power supply circuit 9, the main power input port 26 of the NFC communicator 3, and the main power input port 14 of the control circuit 2. The above-mentioned configuration also suppresses the first power supply voltage Vcc outputted from the power supply circuit 9 from counterflowing to the power feeding port 27 of the NFC communicator 3.

According to the above-described communication apparatus, non-contact communication with an external device can be performed even when the first power supply stops its operation. Also, electric power received from the external device is supplied to a communication node in order for the communication node to operate, but is not supplied to at least the main controller. That is, the supply target of the second power supply voltage is not all of the supply target of the first power supply voltage, but is more limited compared with the supply target of the first power supply voltage. Hence, the communication node can be operated while suppressing the amount of electric power received from the external device. Thus, even when the first power supply stops its operation, good access can be provided from the external device to the communication apparatus by non-contact communication (especially, access to the communication node).

In the present embodiment, the power supply circuit 9 serves as an example of the first power supply, the power feeding circuit 24 serves as an example of the second power supply, the main controller 11 serves as an example of the main controller, the EEPROM 4 and the cartridge IC 5 serve as an example of the communication node, the first diode D1 serves as an example of the first electrical component, and the second diode D2 serves as an example of the second electrical component.

Other Embodiment (1) As an NFC control process executed by the communication controller 21 of the NFC communicator 3, various processes other than the process in FIG. 4 are conceived. For example, a process shown in FIG. 5 can be used. The NFC control process in FIG. 5 will be described.

Figure 5:
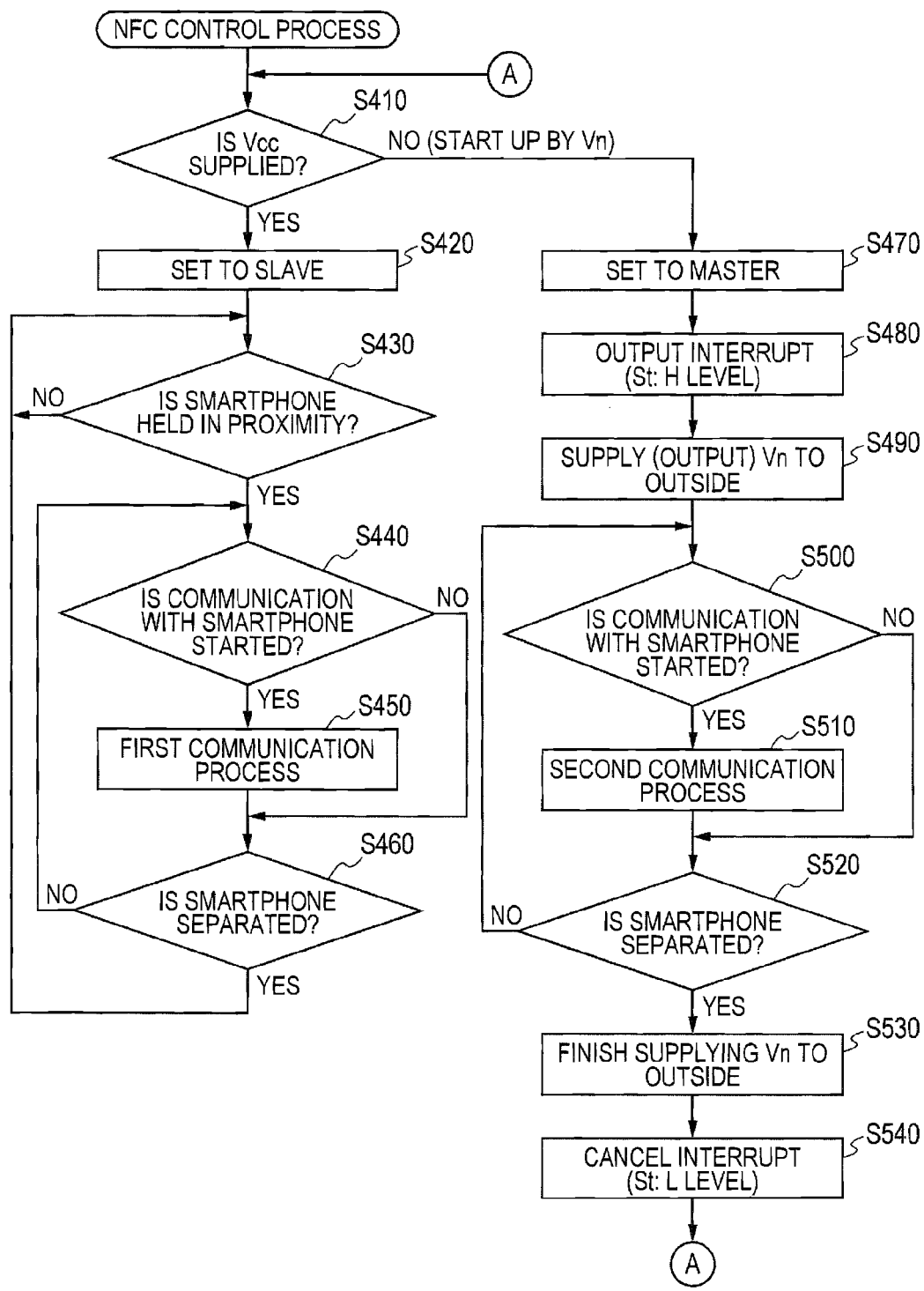
FIG. 5 is a flowchart showing an NFC control process according to another embodiment.

Upon starting the NFC control process in FIG. 5, in S410 the CPU of the communication controller 21 determines whether the first power supply voltage Vcc is supplied from the power supply circuit 9. If the first power supply voltage Vcc is supplied (S410: YES), in S420 the CPU sets the operational mode of serial communication to the slave. In S430, the CPU determines whether the smartphone is held in proximity. If the smartphone is held in proximity (S430: YES), in S440 the CPU determines whether NFC communication with the smartphone is started. If NFC communication with the smartphone is not started (S440: NO), the process advances to S460. If NFC communication with the smartphone is started (S440: YES), the CPU executes the first communication process in S450.

In S460, the CPU determines whether the smartphone is separated from the multifunction peripheral 1. If the smartphone is not separated from the multifunction peripheral 1 (S460: NO), the process returns to S440. If the smartphone is separated from the multifunction peripheral 1 (S460: YES), the process returns to S430.

If in S410 the first power supply voltage Vcc is not supplied (S410: NO), that is, if the communication controller 21 is started up by the second power supply voltage Vn, in S470 the CPU sets the operational mode of serial communication to the master. In S480, the CPU outputs an interrupt to the control circuit 2. In S490, the second power supply voltage Vn generated by the power feeding circuit 24 is outputted from the power feeding port 27.

In S500, the CPU determines whether NFC communication with the smartphone is started. If NFC communication with the smartphone is not started (S500: NO), the process advances to S520. If NFC communication with the smartphone is started (S500: YES), in S510 the CPU executes the second communication process.

In S520, the CPU determines whether the smartphone is separated from the multifunction peripheral 1. If the smartphone is not separated from the multifunction peripheral 1 (S520: NO), the process returns to S500. If the smartphone is separated from the multifunction peripheral 1 (S520: YES), the process advances to S530.

In S530, the CPU finishes supplying of the second power supply voltage Vn to the outside. In S540, the CPU cancels the interrupt to the control circuit 2. After the process in S540, the process returns to S410.

The above-described NFC control process in FIG. 5 also can obtain similar effects as those of the NFC control process in FIG. 4.

(2) In the above-described embodiment, the state notification signal St is used as a method of informing the control circuit 2 about whether the smartphone 100 is held near the multifunction peripheral 1. This is merely one example. The similar function may be realized by using a method other than the method of using the state notification signal St.

(3) An interrupt from the NFC communicator 3 to the control circuit 2 may be outputted in a period from when NFC communication with the smartphone 100 is actually started until when NFC communication with the smartphone 100 is finished. Or, when it is determined that serial communication with the communication nodes such as the EEPROM 4 and the cartridge IC 5 is necessary after the NFC communication with the smartphone 100 is started, an interrupt may be outputted in a period from when the determination is made until when at least the serial communication becomes unnecessary. An interrupt may be outputted at least in a period in which serial communication between the NFC communicator 3 and the communication node is performed. And, the interrupt may be canceled after the serial communication is finished.

(4) Similarly to the above-described period of outputting an interrupt, it is possible to appropriately determine a period of supplying the second power supply voltage Vn of the power feeding circuit 24 to the outside and determine the timing to set the NFC communicator 3 as the master (and timing to return to the slave), based on an execution state of NFC communication, necessity and an execution state of serial communication, and so on.

The second power supply voltage Vn may be always supplied to the outside during a period in which the second power supply voltage Vn is generated by the power feeding circuit 24.

Conversely, output of the second power supply voltage Vn may be suppressed as much as possible. For example, if the smartphone 100 is held near the multifunction peripheral 1 and NFC communication is started with the smartphone 100 when the first power supply voltage Vcc is not generated, the communication controller 21 of the NFC communicator 3 may determine whether serial communication with the communication nodes such as the EEPROM 4 and the cartridge IC 5 is necessary, based on the content of the NFC communication (information that is transmitted and received). And, upon determination that serial communication with the communication nodes such as the EEPROM 4 and the cartridge IC 5 is necessary, the communication controller 21 may output the second power supply voltage Vn generated by the power feeding circuit 24 from the power feeding port 27. This suppresses the amount of consumption of electric power supplied from the smartphone 100 in a non-contact manner.

It is possible to appropriately determine whether to generate the second power supply voltage Vn or whether to output the second power supply voltage Vn to the outside, when the first power supply voltage Vcc is supplied from the power supply circuit 9.

It is possible to appropriately determine at which timing the master and the slave is switched, at which timing supplying of the second power supply voltage Vn to the outside is performed and stopped, and so on, in a case where a NO determination is made in S240 in the NFC control process shown in FIG. 4.

(5) In the above-described embodiment, the EEPROM 4 and the cartridge IC 5 are shown as the communication node that serves as the slave, other than the NFC communicator 3. These are merely one example. The kind and the number of communication nodes are not limited to a specific kind and number. Further, it is not always necessary to supply all of these communication nodes with the second power supply voltage Vn. For example, the apparatus may be so configured that the second power supply voltage Vn is supplied to a communication node that needs to perform serial communication even in a main power OFF state, and that the second power supply voltage Vn is not supplied to a communication node that does not need to perform serial communication in the main power OFF state.

(6) In the above-described embodiment, as a data communication method between communication nodes, serial communication of the master-slave method is illustrated as an example. However, the invention is neither limited to the master-slave method, nor to serial communication.

(7) In the above-described embodiment, the smartphone 100 is illustrated as an example of an external device that can perform NFC communication with the multifunction peripheral 1. However, another external device other than the smartphone 100 (an external device having a NFC communication function) could perform NFC communication with the multifunction peripheral 1, like the smartphone 100 does.

(8) While the invention has been described in detail with reference to the above aspects thereof, it would be apparent to those skilled in the art that various changes and modifications may be made therein without departing from the scope of the claims. For example, a part of the configuration in the above-described embodiment may be replaced with a known configuration having a similar function, may be added to or replaced with a configuration in other embodiments, or may be omitted as long as technical problem can be solved. Further, the above-described plurality of embodiments may be combined appropriately.

What is claimed is:

1. A communication apparatus comprising:
a first power supply configured to generate first power;
an antenna configured to perform non-contact communication with an external device;
a second power supply configured to generate second power based on electric power supplied from the external device via the antenna, the second power being less than the first power;
a communication controller configured to control non-contact communication with the external device via the antenna while at least one of the first power and the second power is supplied to the communication controller;
a main controller configured to control the communication apparatus to perform a function thereof while the first power is supplied to the main controller;
a communication node configured to operate while at least one of the first power and the second power is supplied to the communication node, the communication node having a power input port;
a first supply route that electrically connects the first power supply to the power input port of the communication node;
a second supply route that electrically connects the second power supply to the power input port of the communication node, wherein the first supply route leading from the first power supply and the second supply route leading from the second power supply join together and connect to the power input port;
a first electrical component provided on the first supply route and between the power input port and a particular target electrically connected to the first supply route, the first electrical component being configured to prevent the second power from flowing to the particular target through the first supply route while the second power is supplied to the communication node, the particular target being different from the communication node; and
a second electrical component provided on the second supply route and between the power input port and the second power supply, the second electrical component being configured to prevent the first power from flowing to the second power supply through the second supply route while the first power is supplied to the communication node and to the particular target,
wherein the communication controller is configured to communicate with the communication node in a certain data communication method while the second power is supplied to the communication node;

wherein, while the first power supply supplies the first power to the communication node through the first electrical component on the first supply route, the second electrical component prevents the first power from flowing to the second power supply; and wherein the second power supply is configured, in response to reception of electric power from the external device via the antenna, to supply the second power to the communication controller, and while the second power supply supplies the second power to the communication node through the second electrical component on the second supply route, the first electrical component prevents the second power from flowing to the first power supply and to the particular target.

2. The communication apparatus according to claim 1, wherein the communication node comprises a storage medium configured to store data; and wherein the communication controller is configured to perform, based on information received from the external device, at least one of: a data transmission process of reading out data stored in the storage medium and of transmitting the data to the external device; and a data storage process of storing data received from the external device in the storage medium.

3. The communication apparatus according to claim 2, wherein the storage medium is configured to store at least one of data that is needed for the main controller to control execution of a function of the communication apparatus and data that is generated as a result of the main controller's controlling execution of the function of the communication apparatus.

4. The communication apparatus according to claim 3, wherein, in response to supplying of the second power from the second power supply to the communication controller and the communication node when the first power is not generated by the first power supply, the communication controller is configured to perform at least one of reading of data stored in the storage medium and writing of data to the storage medium by performing data communication with the communication node based on the non-contact communication with the external device.

5. The communication apparatus according to claim 1, wherein, in response to reception of information from the external device by non-contact communication when the first power is not generated by the first power supply, the communication controller is configured to determine, based on the receiving information, whether data communication with the communication node is necessary; and wherein the second power supply is configured to supply the second power to the communication controller in response to reception of electric power from the external device via the antenna, and to supply the second power to the communication node through the second supply route in response to determining that data communication with the communication node is necessary.

6. The communication apparatus according to claim 1, wherein the first supply route and the second supply route are so configured that electric power supplied from the external device is supplied to the communication node, but is not supplied to the main controller.

7. The communication apparatus according to claim 1, wherein the certain data communication method is serial communication of a master-slave method in which the communication controller performs serial communication as master or as slave; and wherein, when non-contact communication with the external device becomes possible, the communication controller is configured to:
output an interrupt to the main controller;
determine whether there is a response to input of the interrupt from the main controller;
in case that there is no response to input of the interrupt, set an operational mode of the serial communication to the master; and
control the second power supply to supply the second power to the communication node.

8. The communication apparatus according to claim 1, wherein the certain data communication method is serial communication of a master-slave method in which the communication controller performs serial communication as master or as slave; and wherein the communication controller is configured to:
determine whether the first power is supplied from the first power supply;
in case that the first power is not supplied, set an operational mode of the serial communication to the master; and
control the second power supply to supply the second power to the communication node.

9. The communication apparatus according to claim 1, wherein the first electrical component is provided on the first supply route so as to supply the first power from the first power supply to the power input port.

10. The communication apparatus according to claim 1, wherein the second electrical component is provided on the second supply route so as to supply the second power from the second power supply to the power input port.

11. The communication apparatus according to claim 1, wherein the first electrical component is a diode.

12. The communication apparatus according to claim 1, further comprising:
a printer configured to print an image on a recording medium;
a wireless LAN communicator configured to perform communication with an external communication device by wireless LAN; and
a communication network connector configured to be connected to an external communication network, and to perform telephone and facsimile communication,
wherein the communication node comprises a nonvolatile memory configured to store at least one of product setting information, connection information with an access point in wireless LAN communication, telephone directory information, error information at the time of a failure, and usage history of a cartridge used for the printer.

13. The communication apparatus according to claim 1, further comprising:
a printer configured to print an image on a recording medium,
wherein the communication node comprises a cartridge IC having a memory configured to store at least one of model information of an ink cartridge used for the printer, and information on a remaining amount of ink.

* * * * *